(12) United States Patent
Urano et al.

(10) Patent No.: US 8,469,430 B2
(45) Date of Patent: Jun. 25, 2013

(54) AUTOMOTIVE REAR BODY STRUCTURE

(75) Inventors: Chikato Urano, Wako (JP); Atsushi Tanai, Haga-machi (JP)

(73) Assignee: Honda Motor Co., Ltd, Tokyo (JP)

(*) Notice: Subject to any disclaimer, the term of this patent is extended or adjusted under 35 U.S.C. 154(b) by 0 days.

(21) Appl. No.: 13/570,706

(22) Filed: Aug. 9, 2012

(65) Prior Publication Data

US 2013/0049394 A1    Feb. 28, 2013

(30) Foreign Application Priority Data

Aug. 24, 2011    (JP) .................................. 2011-182995

(51) Int. Cl.
    *B62D 43/08*    (2006.01)
(52) U.S. Cl.
    USPC ....................................... 296/37.2; 224/42.12
(58) Field of Classification Search
    USPC ............. 296/37.2, 203.01, 203.04; 224/42.12
    See application file for complete search history.

(56) References Cited

U.S. PATENT DOCUMENTS 2,647,012 A * 7/1953 Walker ......................... 296/37.2

FOREIGN PATENT DOCUMENTS

| JP | 08040318 A | * | 2/1996 |
| JP | 2000-16354 A | | 1/2000 |
| JP | 2004262310 A | * | 9/2004 |
| JP | 2006335096 A | * | 12/2006 |
| JP | 2009-132169 A | | 6/2009 |

* cited by examiner

*Primary Examiner* — Dennis Pedder
*Assistant Examiner* — Beverly Becker
(74) *Attorney, Agent, or Firm* — Westerman, Hattori, Daniels & Adrian, LLP

(57)    ABSTRACT

A tire carrier member stands on a front inclined surface of a luggage storage well formed in a floor panel. Tire supporting flanges having upper surfaces on which a spare tire is placed are provided at the lower part of the tire carrier member. A tire fixing portion to which the spare tire in a vertical position is detachably fixed is provided above the tire supporting flanges.

5 Claims, 8 Drawing Sheets

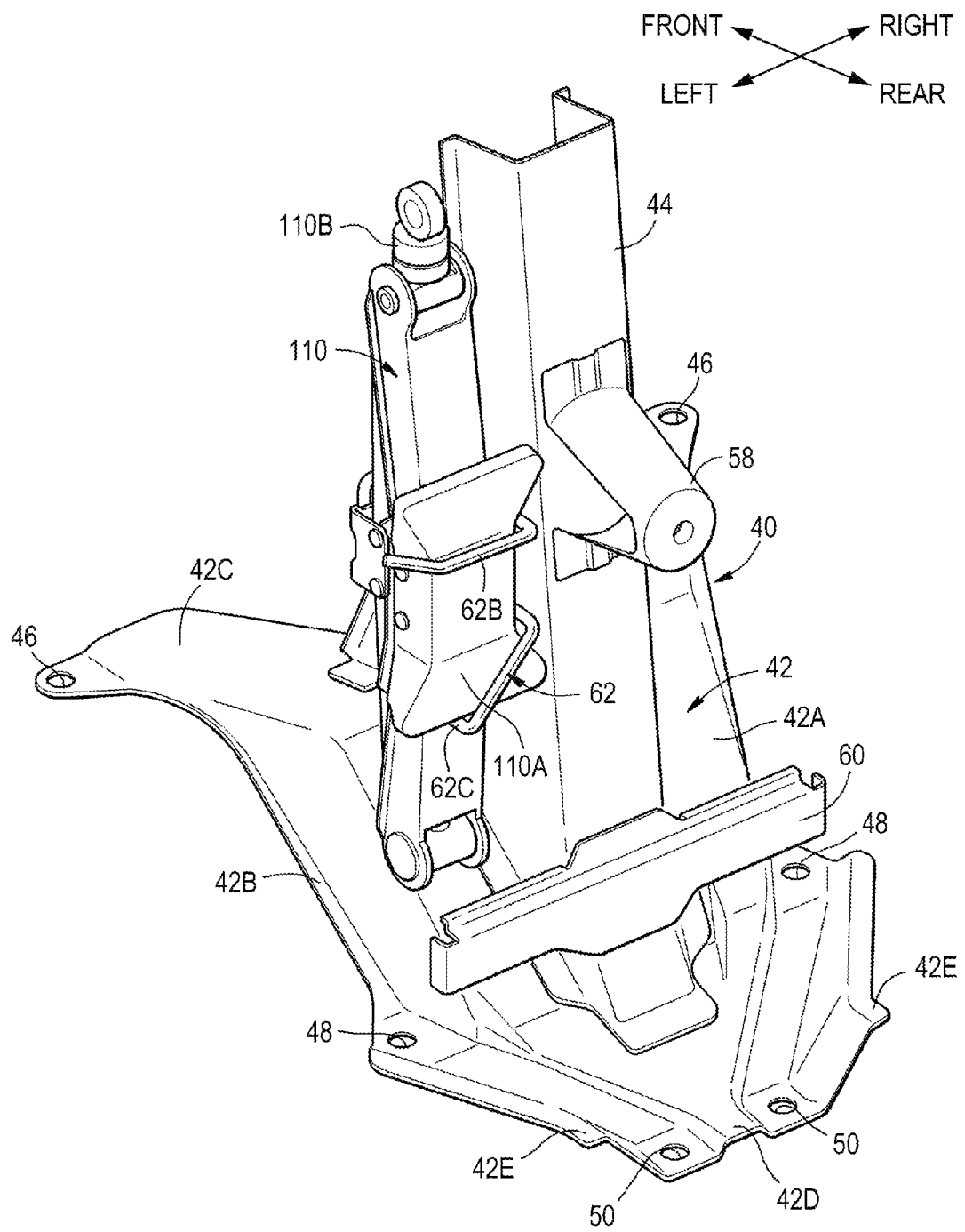

AUTOMOTIVE REAR BODY STRUCTURE

CROSS REFERENCES TO RELATED APPLICATIONS

The present application claims priority under 35 U.S.C. §119 to Japanese Patent Application No. 2011-182995, filed Aug. 24, 2011, entitled "Automotive Rear Body Structure." The contents of this application are incorporated herein by reference in their entirety.

TECHNICAL FIELD

The present disclosure relates to an automotive rear body structure, and more specifically, it relates to an automotive rear body structure including a spare tire supporting structure that supports a spare tire in a standing position or a vertical position behind a rear seat.

BACKGROUND

Automotive rear body structures including a spare tire supporting structure that supports a spare tire or a punctured tire in a vertical position in a luggage compartment behind a rear seat are known. Examples of such automotive rear body structures include an automotive rear body structure that has an L-shaped bracket screwed to a flat surface of a floor panel behind a rear seat, in which a punctured tire is attached in a vertical position to the rear surface of a vertical part of the L-shaped bracket (for example, Japanese Unexamined Patent Application Publication No. 2000-16354). Another example includes an automotive rear body structure in which a spare tire is attached to a rear surface of a cross member disposed on a floor panel behind a rear seat (for example, Japanese Unexamined Patent Application Publication No. 2009-132169).

However, in the former example of the automotive rear body structure in which a punctured tire is attached in a vertical position to the rear surface of the vertical part of an L-shaped bracket attached to a flat surface of a floor panel behind a rear seat, higher attachment strength of the L-shaped bracket to the vehicle body needs is required. This is achieved by, for example, increasing the size of the L-shaped bracket, and thus the structure that supports a spare tire (or a punctured tire) with the L-shaped bracket also increases in size and weight.

In the latter example of the automotive rear body structure in which a spare tire is attached to the rear surface of a cross member, the height of the cross member needs to be increased in order to attach a hub of the spare tire to the rear surface of the cross member. For this reason, the size of the cross member increases and the amount of protrusion of the cross member into the vehicle interior increases, which reduces the vehicle interior space.

The present disclosure appropriately supports a spare tire in a standing position or a vertical position behind a rear seat without increasing the size and weight of the spare tire supporting structure, and without reducing the vehicle interior space while making effective use of an existing (original) rear body structure.

SUMMARY

According to an aspect of the present disclosure, an automotive rear body structure in which a spare tire is supported in a standing position behind a rear seat comprises a floor panel having a luggage storage well formed in the rear thereof; and a tire carrier member disposed upright on a front slope of the luggage storage well. The tire carrier member includes a tire supporting flange provided at a lower part thereof, the tire supporting flange including an upper surface on which the spare tire is placed, and a tire fixing portion provided above the tire supporting flange, the tire fixing portion detachably fixing the spare tire placed on the tire supporting flange in the standing position.

The tire carrier member is vertically stood on the front inclined surface of the luggage storage well of the rear floor panel. Thus, compared to a tire carrier member having the same cross-sectional area and vertically stood on a horizontal flat surface, the area of the surface in contact with the rear floor panel is larger. Thus, a sufficient attachment strength of the tire carrier member to the vehicle body can be obtained without increasing the size and weight of the tire carrier member, and the spare tire can be appropriately supported in a vertical position behind the rear seat without reducing the vehicle interior space.

It is preferable that the automotive rear body structure further includes a first rear floor cross member located in front of the luggage storage well, extending in a vehicle width direction and connected at both ends thereof to left and right rear side frames extending in a front-rear direction; a second rear floor cross member provided along the luggage storage well, extending in the vehicle width direction and connected at both ends thereof to the left and right rear side frames; and a seatbelt anchor reinforcement member provided on the floor panel and connected to the first rear floor cross member. The tire carrier member includes an attachment base member and a post member. The attachment base member includes the tire supporting flange and an inclined portion inclined along a surface of the front slope of the luggage storage well. A front portion of the attachment base member is fixed to the seatbelt anchor reinforcement member with the floor panel therebetween, and a rear portion of the attachment base member is fixed to the second rear floor cross member with the floor panel therebetween. The post member is connected at the lower end thereof to the inclined portion of the attachment base member, extends upright from the attachment base member, and includes the tire fixing portion.

In this case, the attachment base member is connected to the first rear floor cross member by the seatbelt anchor reinforcement member and is connected to the second rear floor cross member. Thus, by making effective use of an existing original rear body structure, the attachment strength of the attachment base member to the vehicle body can be increased.

It is preferable that the second rear floor cross member includes an inverted hat-shaped cross section including front and rear connecting flanges connected to the floor panel respectively. The attachment base member is fixed to the front connecting flange at left and right front fixing points, and fixed to the rear connecting flange at left and right rear fixing points. The distance C between the left and right rear fixing points is smaller than the distance B between the left and right front fixing points. The tire supporting flange is disposed above the left and right rear fixing points and comprises left and right tire supporting flange members disposed on the outer side of the left and right rear fixing points in the vehicle width direction, respectively.

In this case, the distance in the left-right direction between the left and right tire supporting flange members can be easily set to a distance appropriate for stably supporting the bottom of the spare tire at two (left and right) points.

It is preferable that at a position below the tire fixing portion and above the tire supporting flanges, a tire front supporting member extending in the vehicle width direction be attached to the post member.

In this case, by pressing the spare tire placed on the tire supporting flanges against the tire front supporting member, the spare tire is stably supported in a vertical position by the tire carrier member.

It is preferable that the automotive rear body structure further include a jack supporting portion that detachably supports a jack on a side surface of the post member.

In this case, a side surface of the post member can be used for supporting the jack.

BRIEF DESCRIPTION OF THE DRAWINGS

The advantages of the disclosure will become apparent in the following description taken in conjunction with the following drawings.

FIG. 8 is a perspective view of the tire carrier portion of the automotive rear body structure according to the embodiment with the jack attached.

DETAILED DESCRIPTION

Figure 1:
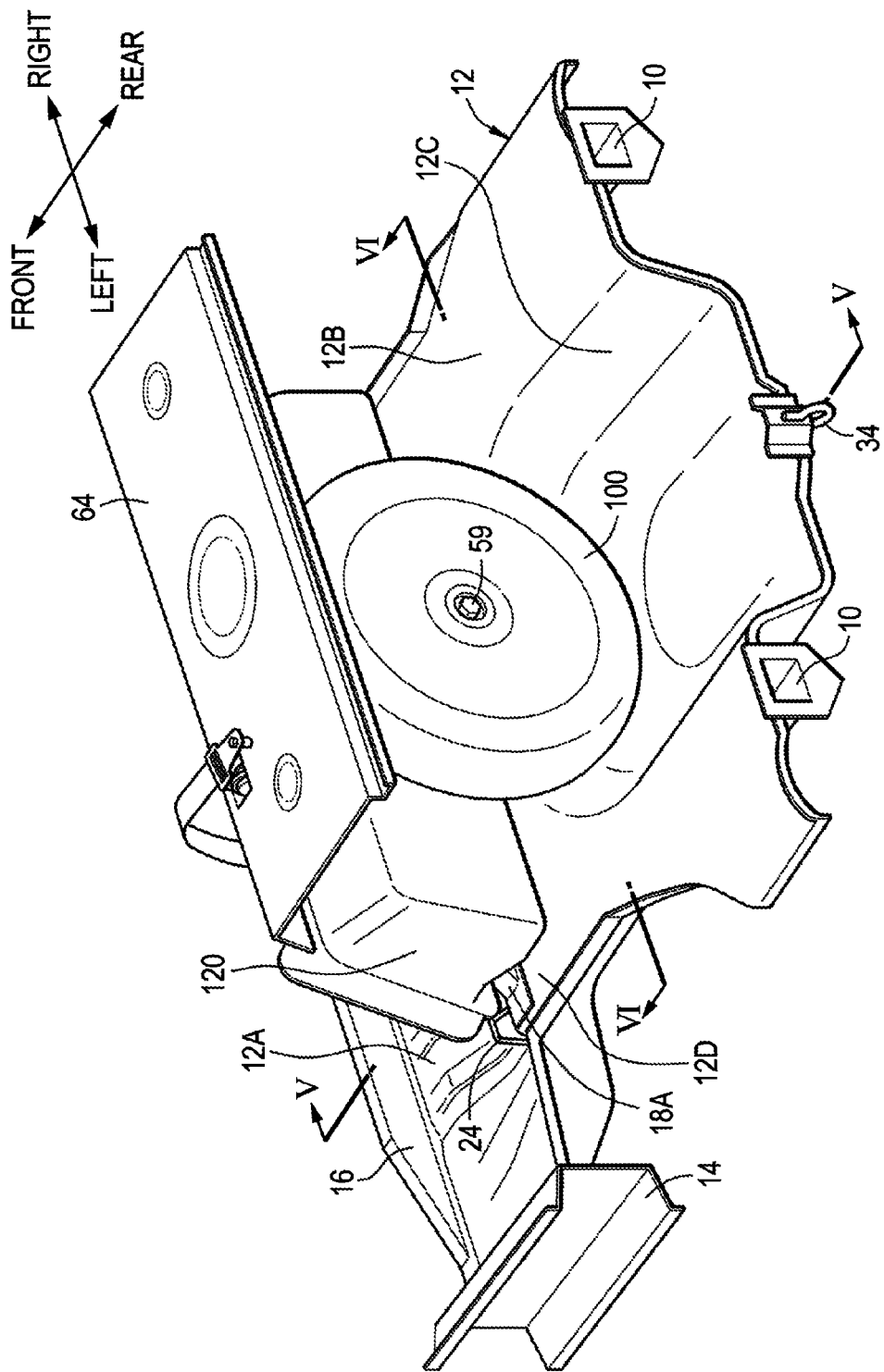
FIG. 1 is a perspective view of an automotive rear body structure according to an embodiment of the present disclosure with a spare tire attached.

An embodiment of an automotive rear body structure according to the present disclosure will be described with reference to FIGS. 1 to 8. Members constituting a rear body may be made of steel unless otherwise noted. The members may be connected to each other by spot welding or the like.

As shown in FIG. 1 to FIG. 4, left and right rear floor frames (rear side frames) 10 extending in the front-rear direction are provided as members included in a rear vehicle body. The rear floor frames 10 have an inverted hat-shaped cross section, are connected to the left and right side parts of a rear floor panel 12, and form a closed section together with the rear floor panel 12.

The front ends of the left and right rear floor frames 10 are respectively connected to left and right side sills 14 extending in the front-rear direction, and are respectively connected to the left and right ends of a middle cross member 16 extending in the vehicle width direction (left-right direction). The middle cross member 16 is connected to the rear floor panel 12, forms a closed section (see FIG. 5) together with the rear floor panel 12, and connects to the front ends of the left and right rear floor frames 10. A rear bumper (not shown) is attached to the rear ends of the left and right rear floor frames 10 with a bumper extension member (not shown) therebetween.

The rear floor panel 12 has a seat supporting portion 12A on which a seat portion 17A of a rear seat 17 is placed, and a spare tire pan portion 12B located behind the seat supporting portion 12A, that is, behind the rear seat 17 and forming a floor portion of a luggage compartment. The seat supporting portion 12A and the spare tire pan portion 12B are continuous with each other in the front-rear direction. In the spare tire pan portion 12B, a luggage storage well 12C that is significantly recessed downward is formed. Originally, the luggage storage well 12C is provided for horizontally placing a spare tire 100 in the luggage compartment.

Figure 3:
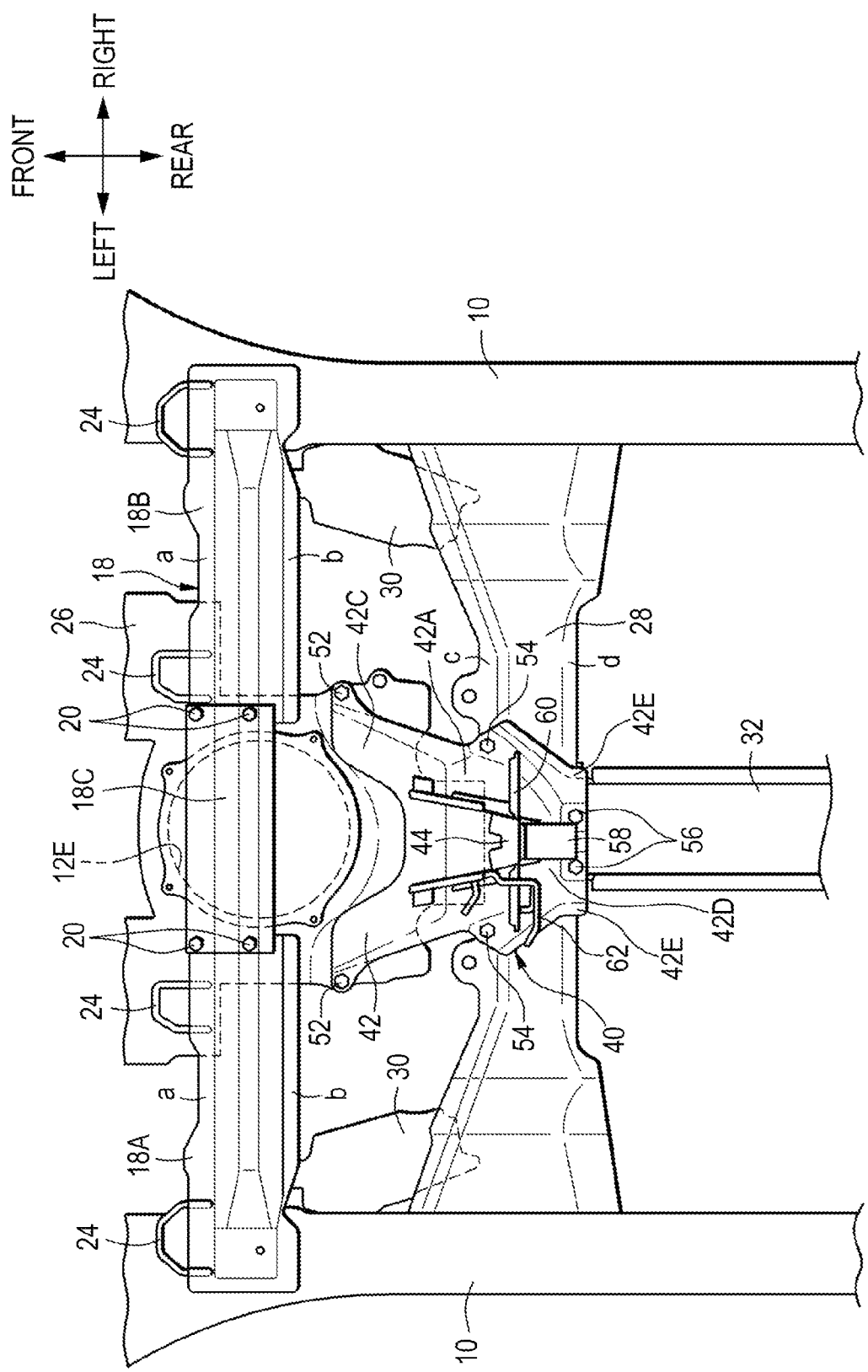
FIG. 3 is a plan view of the automotive rear body structure according to the embodiment with a rear floor panel detached.

In front of the spare tire pan portion 12B, an intermediate flat portion 12D that extends in the vehicle width direction and is entirely flat exists between the seat supporting portion 12A and the spare tire pan portion 12B. On the upper surface (interior surface) of the intermediate flat portion 12D, a first rear floor cross member 18 is provided. As shown in FIG. 3, the first rear floor cross member 18 extends in the vehicle width direction across a fuel tank maintenance opening 12E formed in the rear floor panel 12. In order to obtain accessibility to the opening 12E from the vehicle interior, the first rear floor cross member 18 includes left and right side members 18A and 18B connected to the left and right rear floor frames 10 and the upper surface of the rear floor panel 12, and a center member 18C located directly above the opening 12E and detachably connected to the left and right side members 18A and 18B with bolts 20.

Figure 5:
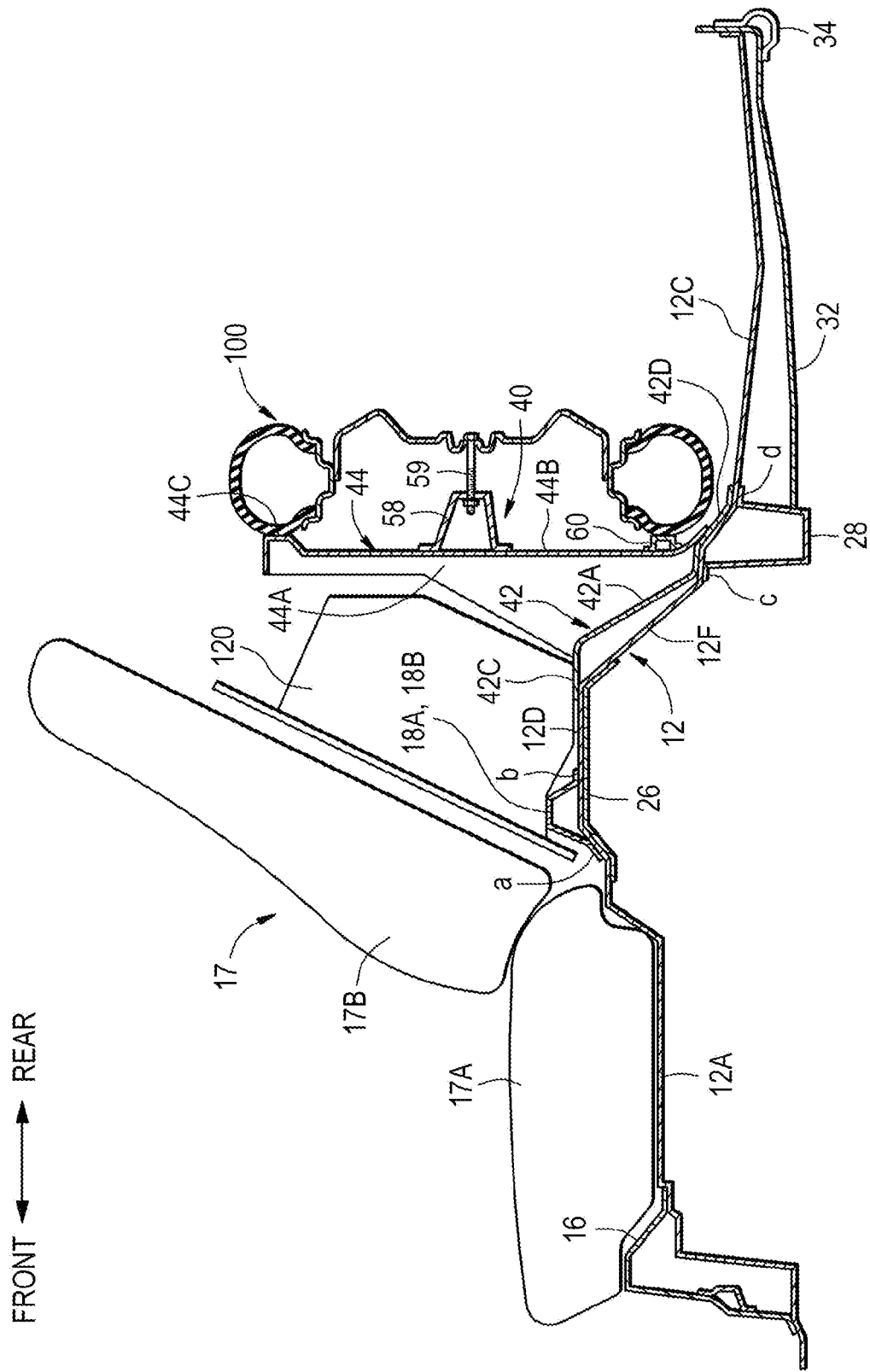
FIG. 5 is a sectional view taken along line V-V of FIG. 1.
Figure 6:
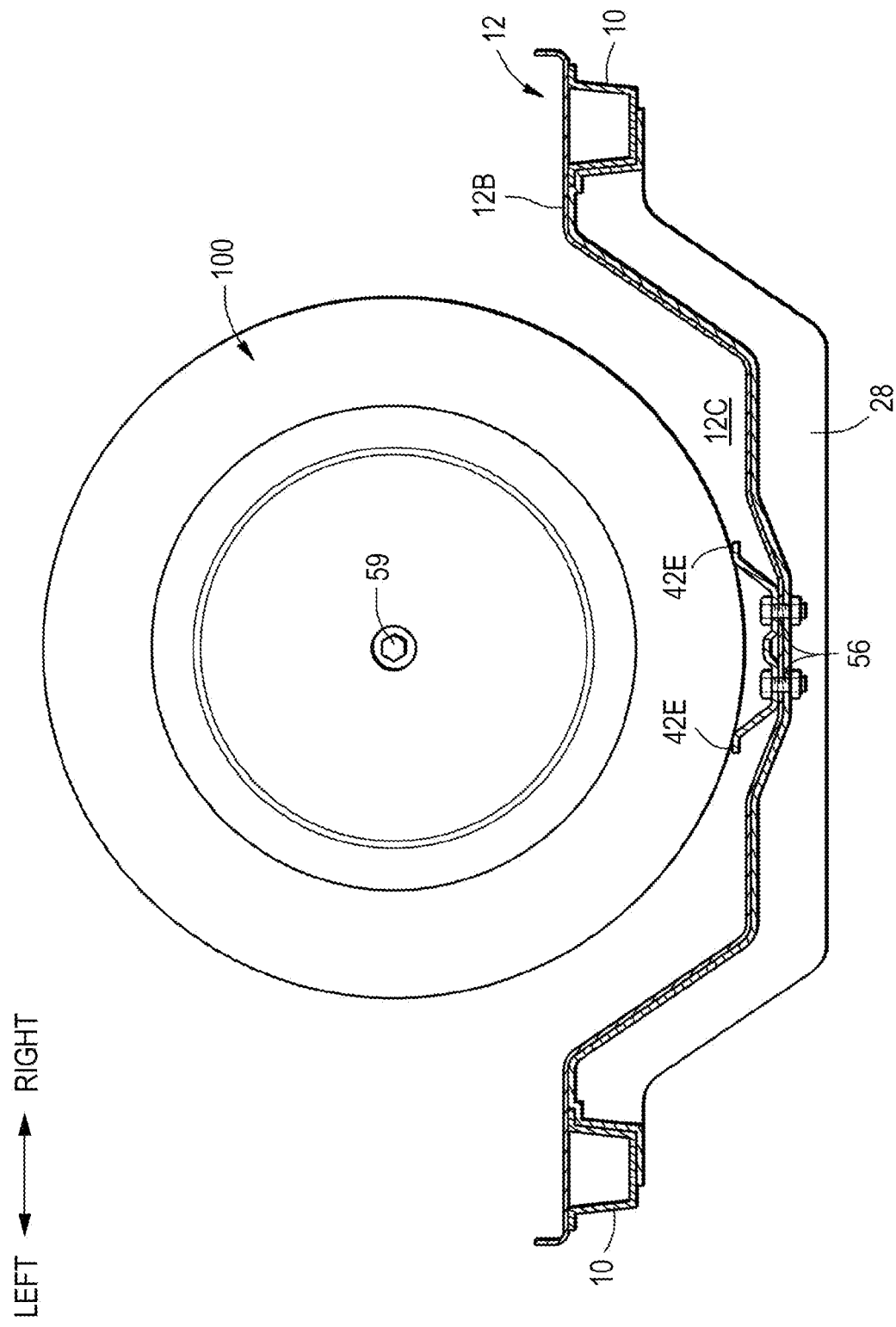
FIG. 6 is a sectional view taken along line VI-VI of FIG. 1.

The side members 18A and 18B each have a hat-shaped cross section having welding flanges a and b (see FIG. 3) in the front and rear thereof, are connected at the welding flanges "a" and "b" to the upper surface of the rear floor panel 12, and form a closed cross section together with the rear floor panel 12 (see FIG. 5).

Anchors 24 for attaching child seats are connected to the welding flanges "a" in the front of the side members 18A and 18B together with the rear floor panel 12. A plate-like seatbelt anchor reinforcement member 26 provided on the central part in the vehicle width direction of the rear floor panel 12 so as to surround the opening 12E is connected to both the welding flanges "a" and "b" of the left and right members 18A and 18B with the rear floor panel 12 therebetween. The seatbelt anchor reinforcement member 26 is connected to the left and right members 18A and 18B of the first rear floor cross member 18 together with the rear floor panel 12, thereby increasing the strength of the left and right members 18A and 18B to which the anchors 24 are attached.

On the lower surface (exterior surface) of the spare tire pan portion 12B, a second rear floor cross member 28 is provided along the periphery of the luggage storage well 12C. The second rear floor cross member 28 has an inverted hat-shaped cross section having welding flanges "c" and "d" (see FIG. 3) in the front and rear thereof, conforms to the recessed shape of the luggage storage well 12C, extends along the luggage storage well 12C in the vehicle width direction, is connected at the welding flanges "c" and "d" to the lower surface of the rear floor panel 12, forms a closed cross section together with the rear floor panel 12 (see FIG. 5), and is connected at the left and right ends thereof to the left and right rear side frames 10.

Figure 4:
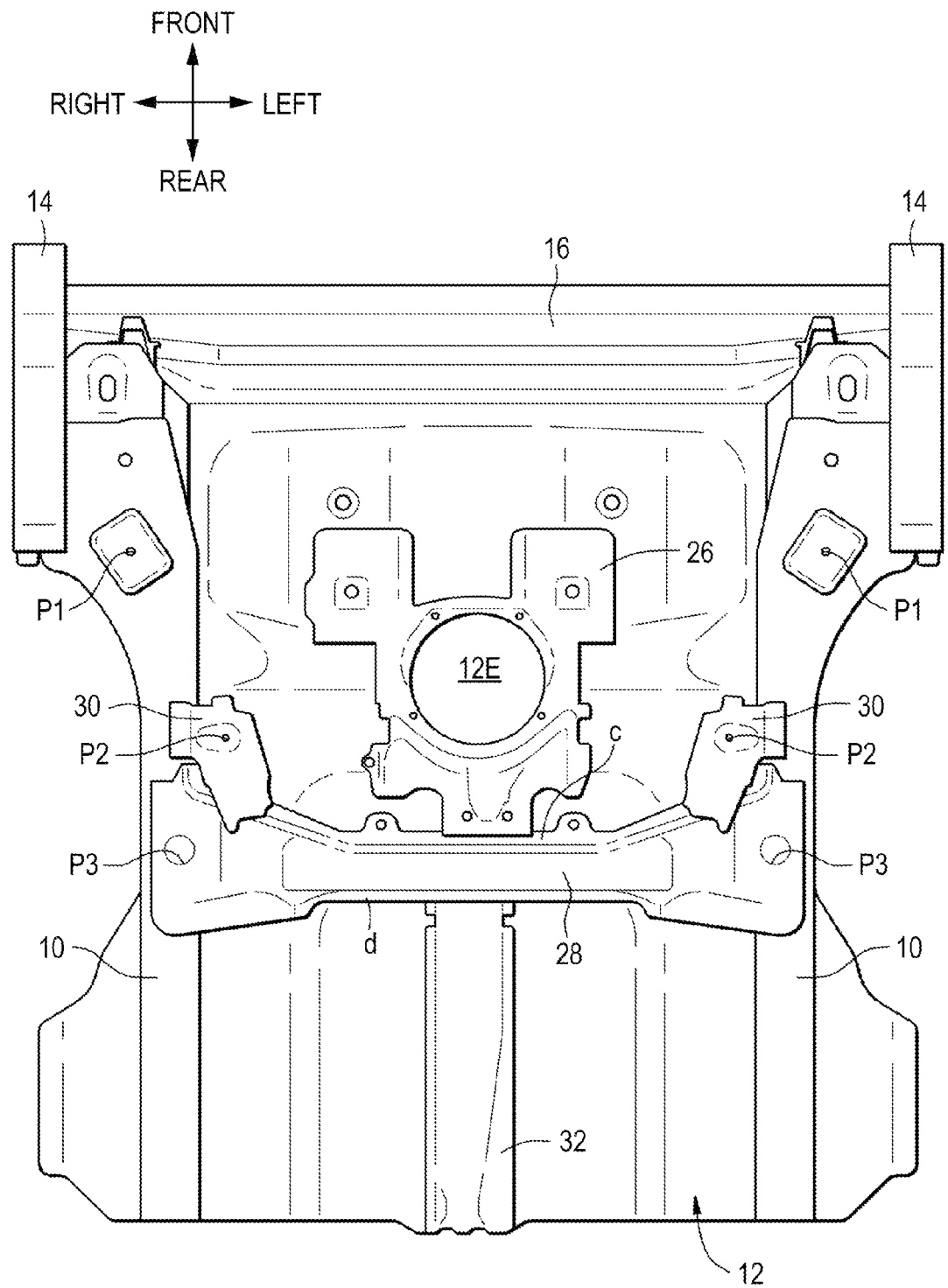
FIG. 4 is a bottom view of the automotive rear body structure according to the embodiment.

In the vicinities of places where the second rear floor cross member 28 is connected to the rear side frames 10, outriggers 30 are provided. The outriggers 30 are connected to the vicinities of the left and right ends of the second rear floor cross member 28 and the left and right rear side frames 10. Between the junctions between the second rear floor cross member 28 including the outriggers 30 and the rear side frames 10, and the front parts of the rear side frames 10, rear suspension mechanism attachment portions are placed. In FIG. 4, reference symbol P1 denotes front attachment points for rear suspension arms set in the front parts of the rear side frames 10, reference symbol P2 denotes rear attachment points for the rear suspension arms set in the outriggers 30, and reference symbol P3 denotes attachment points for rear suspension springs set in the junctions between the second rear floor cross member 28 and the rear side frames 10.

In the central part in the vehicle width direction of the spare tire pan portion 12B, a rear center frame 32 is provided along the lower surface (exterior surface) of the luggage storage well 12C. The rear center frame 32 has an inverted hat-shaped cross section, is connected to the lower surface of the rear floor panel 12, and forms a closed cross section (see FIG. 5) together with the rear floor panel 12. The front end of the rear center frame 32 is connected to the rear surface of the second rear floor cross member 28. Thus, the rear center frame 32 functions as a collision load transmitting member that transmits the rear end collision load to the second rear floor cross member 28. A tow hook 34 (see FIG. 2) is attached to the rear end of the rear center frame 32.

Figure 2:
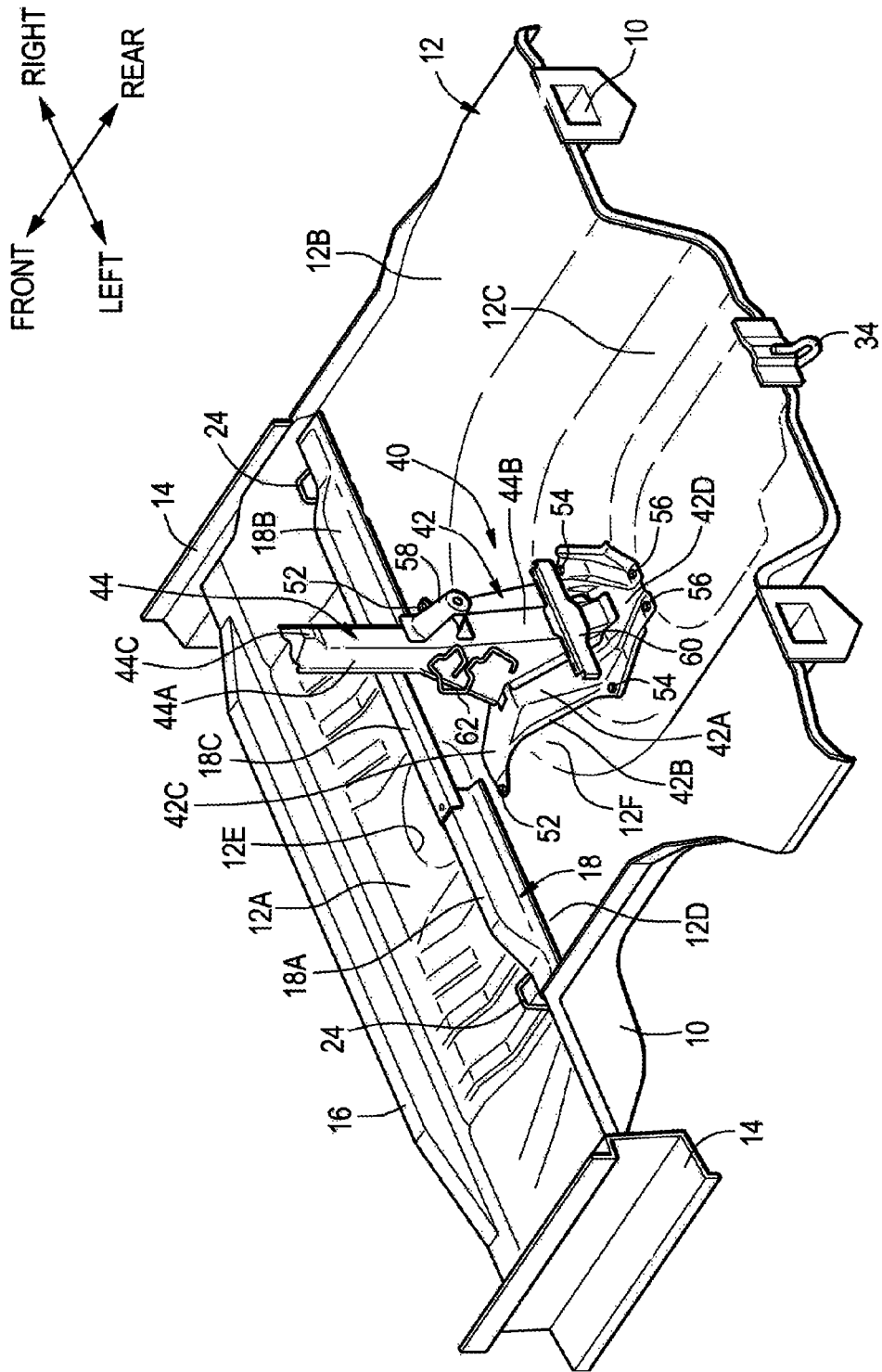
FIG. 2 is a perspective view of the automotive rear body structure according to the embodiment with the spare tire detached.

In the spare tire pan portion 12B, a tire carrier member 40 stands on a front inclined surface 12F of the luggage storage well 12C. As shown in FIGS. 2 and 3, the tire carrier member 40 is located in the central part in the vehicle width direction, that is, at a position directly above the rear center frame 32 as viewed from the front-rear direction, and includes an attachment base member 42 attached to the rear floor panel 12 and a post member 44 to which the spare tire 100 is attached.

As shown in FIGS. 2, 5, 7, and 8, the attachment base member 42 has an inclined portion 42A inclined along the front inclined surface 12F of the luggage storage well 12C, side flanges 42B provided along the left and right edges of the inclined portion 42A and placed on the front inclined surface (interior surface) 12F, an upper portion 42C continuous with the upper side of the inclined portion 42A, extending toward the vehicle front, and placed on the upper surface of the intermediate flat portion 12D, and a lower portion 42D continuous with the lower side of the inclined portion 42A, extending toward the vehicle rear, and placed on the upper surface of the bottom of the luggage storage well 12C.

Figure 7:
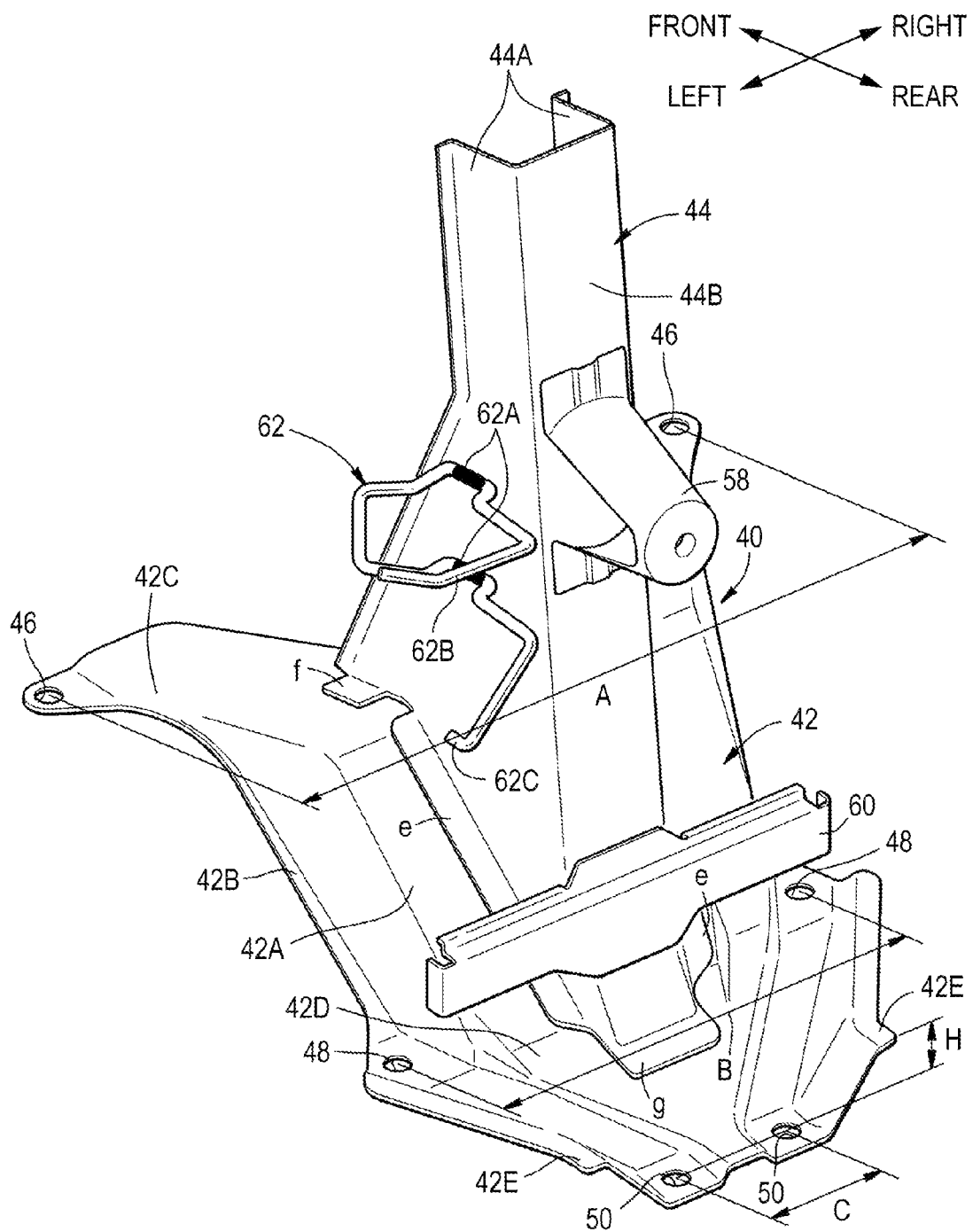
FIG. 7 is a perspective view of a tire carrier portion of the automotive rear body structure according to the embodiment with a jack detached.

As shown in FIGS. 7 and 8, bolt holes 46 are formed in two places in the left and right front of the upper portion 42C, bolt holes 48 are formed in two places in the left and right front of the lower portion 42D, and bolt holes 50 are formed in two places in the left and right rear of the lower portion 42D.

The upper portion 42C is fixed to the seatbelt anchor reinforcement member 26 with the rear floor panel 12 therebetween with bolts 52 inserted into the bolt holes 46. The lower portion 42D is fixed to the welding flange "c" in the front of the second rear floor cross member 28 with the rear floor panel 12 therebetween with bolts 54 inserted into the front bolt holes 48, and is fixed to the welding flange "d" in the rear of the second rear floor cross member 28 with the rear floor panel 12 therebetween with bolts 56 inserted into the rear bolt holes 50. The attachment base member 42 is firmly fixed, by bolting at six points, to the seatbelt anchor reinforcement member 26, which is connected to the side members 18A and 18B of the first rear floor cross member 18 having high strength, and the second rear floor cross member 28.

Thus, by making effective use of an existing original rear body structure, the attachment strength of the attachment base member 42 to the vehicle body can be increased.

The inclined portion 42A of the attachment base member 42 fixed to the interior surface of the rear floor panel 12 forms a closed box-shape together with the side flanges 42B, the upper portion 42C, the lower portion 42D, and the front inclined surface 12F. Accordingly, the attachment base member 42 has high rigidity.

Having the above-described attachment structure and being located at the same position in the vehicle width direction as the seatbelt anchor reinforcement member 26, that is, a position directly above the rear center frame 32 as viewed from the front-rear direction, the attachment base member 42 functions as a collision load transmitting member that distributes and transmits the rear end collision load input into the rear center frame 32 to the side members 18A and 18B of the first rear floor cross member 18 through the seatbelt anchor reinforcement member 26.

As shown in FIG. 7, the distance A in the left-right direction between fixing points where the attachment base member 42 is fixed with the frontmost two (left and right) bolts 52 (bolt holes 46), the distance B in the left-right direction between fixing points where the attachment base member 42 is fixed with the two (left and right) bolts 54 (bolt holes 48) behind the bolts 52 (the distance in the vehicle width direction between front fixing points), and the distance C in the left-right direction between fixing points where the attachment base member 42 is fixed with the two (left and right) bolts 56 (bolt holes 50) behind the bolts 54 (the distance in the vehicle width direction between rear fixing points) are in the following relationship: A>B>C. That is, the distance C in the vehicle width direction between rear fixing points where the lower portion 42D is fixed with the two (left and right) bolts 56 is smaller than the distance B in the vehicle width direction between front fixing points where the lower portion 42D is fixed with the two (left and right) bolts 54.

The fact that the distance in the left-right direction between fixing points where the attachment base member 42 is fixed to the vehicle body increases toward the vehicle front contributes to the distribution and transmission of the rear end collision load transmitted to the attachment base member 42, to the second rear floor cross member 28 and the side members 18A and 18B of the first rear floor cross member 18 outward in the vehicle width direction (to the left and right).

The attachment base member 42 has tire supporting flanges 42E formed at two places above the two (left and right) rear fixing points where the lower portion 42D is fixed with the bolts 56 and on the outer side thereof in the vehicle width direction (to the left and right side thereof). The tire supporting flanges 42E have substantially horizontal upper surfaces on which the spare tire 100 is placed, and are formed by bending. Thus, the tire supporting flanges 42E are provided in the vicinity of the lower part of the tire carrier member 40. The tire supporting flanges 42E are located at positions higher than the lower portion 42D by a height H. Thus, the clearance between the spare tire 100 placed on the tire supporting flanges 42E and the bottom of the luggage storage well 12C is ensured, and the interference between the spare tire 100 and the heads of the bolts 56 is avoided.

The distance in the left-right direction (vehicle width direction) between the left and right tire supporting flanges 42E is larger than the distance C between the left and right fixing points where the attachment base member 42 is fixed with the bolts 56 (bolt holes 50), but is smaller than the distance B between the left and right fixing points where the attachment base member 42 is fixed with the bolts 54 (bolt holes 48), and is appropriate for stably supporting the bottom of the spare tire 100 at two (left and right) points.

The post member 44 includes left and right side pieces 44A and a rear surface portion 44B, which form a U-shaped channel like cross section. The lower end of the post member 44 has an inclined shape that conforms to the inclined portion 42A of the attachment base member 42. On both (left and right) sides of the lower end of the post member 44, that is, at the lower ends of the left and right side pieces 44A, connecting flanges "e" that conform to the inclined portion 42A and are connected to the inclined portion 42A and connecting flanges "f" connected to the upper portion 42C are provided. At the lower end of the rear surface portion 44B of the post member 44, a connecting flange "g" connected to the lower portion 42D is provided. Thus, the post member 44 is firmly connected to the attachment base member 42 and forms a post that extends vertically upward from the inclined portion 42A.

The left and right side pieces 44A are each divided into three parts: an upper part, a middle part, and a lower part. The lower part has a length in the front-rear direction equal to the total length in the front-rear direction of the inclined portion 42A projected on the horizontal plane plus the lengths in the front-rear direction of part of the upper portion 42C and part of the lower portion 42D. The middle part has a front edge inclined toward the vehicle rear, and the length in the front-rear direction of the middle part decreases as goes upward. The length in the front-rear direction of the upper part is sufficiently small compared to that of the lower part.

A truncated-cone-shaped tire-fixing bracket (tire-fixing member) 58 protruding rearward from the rear surface portion 44B is connected to the middle part of the rear surface portion 44B of the post member 44 above the tire supporting flanges 42E. The hub of the spare tire 100 vertically placed on the tire supporting flanges 42E is detachably fixed to the tire-fixing bracket 58 with a tire attachment bolt 59.

At the upper end of the rear surface portion 44B of the post member 44, that is, a position above the tire-fixing bracket 58, a tire front supporting surface 44C protruding toward the vehicle rear is formed. A tire front supporting member 60 extending in the vehicle width direction is connected to the vicinity of the lower end of the rear surface portion 44B, that is, a position below the tire-fixing bracket 58. The tire front supporting member 60 has a length in the vehicle width direction that is longer than the distance C between the left and right fixing points where the attachment base member 42 is fixed with the bolts 56 (the distance in the vehicle width direction between the rear fixing points) and is about equal to the distance B in the left-right direction between fixing points where the attachment base member 42 is fixed with the two (left and right) bolts 54 (the distance in the vehicle width direction between the front fixing points), and protrudes from the rear surface portion 44B toward the vehicle rear like the tire front supporting surface 44C.

The spare tire 100 that is placed on the tire supporting flanges 42E and whose hub is fixed to the tire-fixing bracket 58 with the tire attachment bolt 59 is detachably attached to the tire carrier member 40, in a standing position, preferably a vertical position, with the upper part pressed against the tire front supporting surface 44C and the lower part pressed against the tire front supporting member 60. By pressing the spare tire 100 placed on the tire supporting flanges 42E against the tire front supporting surface 44C in the upper center and the tire front supporting member 60 located in the lower part and extending in the left-right direction, the spare tire 100 is supported at three points. Thus, the spare tire 100 is stably supported in a vertical position by the tire carrier member 40.

As shown in FIGS. 7 and 8, a jack supporting member 62 is fixed by welding parts 62A to one of the left and right side pieces 44A of the post member 44. The jack supporting member 62 is formed by bending a steel wire rod and integrally has a jack surrounding portion 62B that holds a folded jack 110 detachably in the vertical direction, and a lower engaging portion 62C that engages with the lower edge of a base portion 110A of the jack 110 and prevents the jack 110 from coming off downward.

To attach the jack 110 to the jack supporting member 62, a jack threaded shaft 110B is turned in the jack reduction direction to minimize the jack 110, the jack 110 is inserted into the jack surrounding portion 62B until the lower edge of the base portion 110A comes into contact with the lower engaging portion 62C, and then the jack threaded shaft 110B is turned in the jack extension direction to slightly extend the jack 110 until the jack 110 is pressed against the jack surrounding portion 62B. Thus, the jack 110 can be firmly attached to the jack supporting member 62. The jack 110 can be detached by reversing the above attachment steps.

As described above, the tire carrier member 40 vertically stands on the front inclined surface 12F of the luggage storage well 12C of the rear floor panel 12 using the attachment base member 42. Thus, compared to a tire carrier member having the same cross-sectional area and vertically standing on a horizontal flat surface such as the intermediate flat portion 12D, the area of the surface in contact with the rear floor panel 12 is larger since the tire carrier member 40 stands on the inclined surface. That is, the length of the connecting flanges "e" is larger. Thus, a sufficient attachment strength of the tire carrier member 40 to the vehicle body can be obtained without increasing the size and weight of the tire carrier member 40, and the spare tire 100 can be appropriately supported in a vertical position behind the rear seat 17 without reducing the vehicle interior space.

Since the tire carrier member 40 is not attached to the rear surface of a cross member such as the first rear floor cross member 18, the height of the cross member need not be increased. Thus, the size of the cross member does not increase, and the amount of protrusion of the cross member into the vehicle interior does not increase. Thus, the vehicle interior space is not reduced.

Owing to these, as shown in FIGS. 1 and 5, a space that extends across the full width of the vehicle and is larger in the front-rear direction can be obtained between the backrest 17B of the rear seat 17 and the tire carrier member 40. This space can be used for placing a rechargeable battery unit 120 of an electric vehicle or a hybrid vehicle. In an existing automobile that is neither an electric vehicle nor a hybrid vehicle, space for a rechargeable battery unit 120 can be obtained without making a significant change to the vehicle body configuration.

The luggage storage well 12C formed for placing the spare tire 100 can be used as a place for storing luggage, and the luggage storage volume of the rear luggage compartment increases. Using a side surface of the post member 44 for supporting the jack 110 also increases the luggage storage volume of the rear luggage compartment.

In this embodiment, the tire carrier member 40 consists of two parts: the attachment base member 42 and the post member 44, and thus the degree of freedom of the shapes of the attachment base member 42 and the post member 44 increases, and press formability increases.

In FIG. 1, reference symbol 64 denotes a rear parcel shelf panel disposed above the place to put the rechargeable battery unit 120 and between the backrest 17B of the rear seat 17 and the tire carrier part.

Although a preferred embodiment of the present disclosure have been described, as will be easily understood by the skilled person, the present disclosure is not limited to the above-described embodiment, and various changes may be made without departing from the spirit of the present disclosure. For example, the attachment base member 42 and the post member 44 of the tire carrier member 40 may be integrated with each other. Not all of the components shown in the above-described embodiment are indispensable, and a choice thereof may be made without departing from the spirit of the present disclosure.

What is claimed is:

1. An automotive rear body structure wherein a spare tire is supported in a standing position behind a rear seat, the automotive rear body structure comprising:
    a floor panel having a luggage storage well formed in the rear thereof; and
    a tire carrier member disposed upright on a front slope of the luggage storage well,
    wherein the tire carrier member includes a tire supporting flange provided at a lower part thereof, the tire supporting flange including an upper surface on which the spare tire is placed, and a tire fixing portion provided above the tire supporting flange, the tire fixing portion detachably fixing the spare tire placed on the tire supporting flange in the standing position.

2. The rear body structure according to claim 1, further comprising:
    a first rear floor cross member located in front of the luggage storage well, extending in a vehicle width direction and connected at both ends thereof to left and right rear side frames extending in a front-rear direction;
    a second rear floor cross member provided along the luggage storage well, extending in the vehicle width direction and connected at both ends thereof to the left and right rear side frames; and
    a seatbelt anchor reinforcement member provided on the floor panel and connected to the first rear floor cross member,
    wherein the tire carrier member includes an attachment base member and a post member,
    wherein the attachment base member includes the tire supporting flange and an inclined portion inclined along a surface of the front slope of the luggage storage well,
    wherein a front portion of the attachment base member is fixed to the seatbelt anchor reinforcement member with the floor panel therebetween, and a rear portion of the attachment base member is fixed to the second rear floor cross member with the floor panel therebetween, and
    wherein the post member is connected at the lower end thereof to the inclined portion of the attachment base member, extends upright from the attachment base member, and includes the tire fixing portion.

3. The rear body structure according to claim 2, wherein the second rear floor cross member includes an inverted hat-shaped cross section including front and rear connecting flanges connected to the floor panel respectively,
    wherein the attachment base member is fixed to the front connecting flange at left and right front fixing points, and fixed to the rear connecting flange at left and right rear fixing points,
    wherein the distance C between the left and right rear fixing points is smaller than the distance B between the left and right front fixing points, and
    wherein the tire supporting flange is disposed above the left and right rear fixing points and comprises left and right tire supporting flange members disposed on the outer side of the left and right rear fixing points in the vehicle width direction, respectively.

4. The rear body structure according to claim 2, further comprising a tire front supporting member attached to the post member at a position below the tire fixing portion and above the tire supporting flange, the tire front supporting member extending in the vehicle width direction.

5. The rear body structure according to claim 2, further comprising a jack supporting portion disposed on a side surface of the post member, wherein the jack supporting portion detachably supports a jack.

* * * * *